United States Patent
Drahm et al.

(10) Patent No.: US 9,052,221 B2
(45) Date of Patent: Jun. 9, 2015

(54) FLOW MEASURING DEVICE AND METHOD FOR ASCERTAINING FLOW OF A MEDIUM THROUGH A MEASURING TUBE BASED ON MEDIUM VELOCITY AND CROSS SECTION

(75) Inventors: Wolfgang Drahm, Erding (DE); Alfred Rieder, Landshut (DE); Stefan Heidenblut, Freising (DE); Frank Schmalzried, Neuching (DE); Thomas Sulzer, Grenzach-Wyhlen (DE)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 209 days.

(21) Appl. No.: 13/698,704

(22) PCT Filed: Apr. 14, 2011

(86) PCT No.: PCT/EP2011/055948
§ 371 (c)(1),
(2), (4) Date: Feb. 4, 2013

(87) PCT Pub. No.: WO2011/144398
PCT Pub. Date: Nov. 24, 2011

(65) Prior Publication Data
US 2014/0144246 A1    May 29, 2014

(30) Foreign Application Priority Data
May 19, 2010  (DE) .................. 10 2010 029 119

(51) Int. Cl.
*G01F 1/58* (2006.01)
*G01F 1/00* (2006.01)

(52) U.S. Cl.
CPC *G01F 1/58* (2013.01); *G01F 1/002* (2013.01); *G01F 1/586* (2013.01)

(58) Field of Classification Search
None
See application file for complete search history.

(56) References Cited

U.S. PATENT DOCUMENTS

| | | | |
|---|---|---|---|
| 4,336,719 A | 6/1982 | Lynnworth | |
| 4,546,649 A | 10/1985 | Kantro | |
| 5,684,250 A | 11/1997 | Marsh | |
| 7,079,958 B2 * | 7/2006 | Budmiger et al. | 702/45 |
| 7,137,307 B2 | 11/2006 | Huybrechts | |
| 2010/0300212 A1 * | 12/2010 | Kerrom | 73/861.12 |
| 2012/0036941 A1 * | 2/2012 | Drahm et al. | 73/861.12 |

FOREIGN PATENT DOCUMENTS

| | | |
|---|---|---|
| CN | 1928507 A | 3/2007 |
| DE | 3214650 C2 | 11/1983 |

(Continued)

OTHER PUBLICATIONS

English translation of IPR, Apr. 14, 2011, Geneva.
German Search Report, May 19, 2010, Munich.
International Search Rpt, Apr. 14, 2011, The Netherlands.

*Primary Examiner* — Harshad R Patel
(74) *Attorney, Agent, or Firm* — Bacon & Thomas, PLLC

(57) ABSTRACT

A method and flow measuring device for ascertaining flow of a medium through a measuring tube based on at least a first measurement signal, which depends at least on the flow velocity of the medium in the measuring tube, wherein the first measurement signal is registered, wherein an additional, second measurement signal is registered, which depends on the flow cross sectional area of the medium in the measuring tube and is independent of the flow velocity of the medium in the measuring tube, and wherein flow is ascertained as a function of the first and second measurement signals.

4 Claims, 3 Drawing Sheets

(56) References Cited

FOREIGN PATENT DOCUMENTS

| | | | |
|---|---|---|---|
| DE | 19751241 | A1 | 6/1998 |
| DE | 19708857 | A1 | 7/1998 |
| DE | 10116776 | A1 | 10/2001 |
| DE | 10347890 | A1 | 5/2005 |
| DE | 102007024006 | A1 | 11/2008 |
| DE | 102007058132 | A1 | 6/2009 |
| WO | WO 2008/0141985 | A1 | 11/2008 |

* cited by examiner

FLOW MEASURING DEVICE AND METHOD FOR ASCERTAINING FLOW OF A MEDIUM THROUGH A MEASURING TUBE BASED ON MEDIUM VELOCITY AND CROSS SECTION

TECHNICAL FIELD

The present invention relates to a flow measuring device and to a method for ascertaining the flow of a medium through a measuring tube based on at least a first measurement signal, which depends at least on the flow velocity of the medium in the measuring tube.

BACKGROUND DISCUSSION

Flow measuring devices are widely used, especially in process measurements technology. By way of example, magneto-inductive, flow measuring devices utilize for volumetric flow measurement the principle of electrodynamic induction and are described in a large number of publications. Charge carriers of the medium moved perpendicularly to a magnetic field induce a measurement voltage in measuring electrodes arranged essentially perpendicularly to the flow direction of the medium and perpendicularly to the direction of the magnetic field. The measurement voltage induced in the measuring electrodes is proportional to the flow velocity of the medium averaged over the cross section of the measuring tube and is thus proportional to the volume flow rate. If the density of the medium is known, the mass flow in the pipeline, or in the measuring tube, can be determined. The measurement voltage is usually sensed via a measuring electrode pair, which is arranged in the direction of the measuring tube axis at the region of maximum magnetic field strength and where, thus, the maximum measurement voltage is to be expected.

Magneto-inductive, flow measuring devices include, in such case, usually a measuring tube of metal, lined with a liner of polymer. In addition, there are also magneto-inductive, flow measuring devices with measuring tubes of synthetic material, e.g. plastic. This can have the disadvantage of a greater, and possibly even partially plastic, deformation in the case of the exceeding of a certain pressure of the medium in the measuring tube or after a large number of pressure cycles.

Offenlegungsschrift DE 103 47 890 A1 discloses a magneto-inductive, flow measuring device having a measuring tube composed of layers of fiber composite materials. Between the measuring tube interior and the measuring tube exterior, a strain gage is embedded in the layers, in order to monitor the permitted loading in the particular installation. This does not have a direct influence on the measuring of the flow.

SUMMARY OF THE INVENTION

An object of the invention is to provide a flow measuring device, which is robust as regards pressure fluctuations.

The object is achieved by a method of the invention, whereby flow, especially volume- and/or mass flow, of a medium through a measuring tube is ascertained. Flow is ascertained based on at least a first measurement signal, which depends at least on the flow velocity of the medium in the measuring tube. The first measurement signal can be, for example, travel-time difference or Doppler shift in the case of an ultrasonic flow measurement device, the measurement voltage of a magneto-inductive, flow measuring device sensed between two measuring electrodes, the vortex shedding frequency of a vortex flow measuring device, the rotor RPM of a turbine, flow measuring device or the heat loss of a heater of a thermal flow measuring device. Other examples are known to those skilled in the art, including how the particular measuring signals depend on the flow velocity of the medium in the measuring tube. Based on the example of a magneto-inductive, flow measuring device, the dependence of the measurement voltage on the flow velocity of the medium in the measuring tube will now be sketched in brief. Volume flow $Q_v$ is calculated according to the formula $Q_v = v \ast A$, with v representing flow velocity and A the flow cross sectional area of the medium in the measuring tube. This is in the case of measuring tubes, whose lumen corresponds in cross section to the flow cross sectional area of the medium in the measuring tube, i.e. in the case of completely filled measuring tubes. The flow cross sectional area of the medium in the measuring tube corresponds thus to the passage area of the medium in the region of the measuring transducer. The flow velocity v of the medium in the measuring tube then equals the quotient of the said measurement voltage U and the product of the magnetic field strength and the separation of the electrodes.

If the measurement voltage U enters as first measurement signal into the ascertaining of flow, then the first measurement signal depends at least partially on the, here average, flow velocity. The flow velocity is thus in this example the velocity averaged over the flow cross sectional area.

As a rule, supplementally to the first measurement signal, other factors are taken into consideration in the ascertaining of flow. Thus also flow cross sectional area of the medium in the measuring tube enters into the ascertaining of flow. This is usually assumed to be constant. According to the invention, however, a second measurement signal is registered, which depends on the flow cross sectional area of the medium in the measuring tube and is independent of the flow velocity of the medium in the measuring tube.

By way of example, the first and second measuring signals have only one variable parameter, from which they depend. They represent, so-to-say, flow velocity, respectively, flow cross section, or they represent time rate of change of flow velocity, respectively, flow cross section. The additional parameters, on which the measuring signals depend, are constant or are assumed to be constant.

If flow is calculated in an evaluating unit of the flow measuring device of the invention, such is accomplished according to a predetermined relationship, especially a predetermined formula. The formula includes at least two parameters, with the values of the first measurement signal as first parameter and the values of the second measurement signal as second parameter. The measuring signals would be correspondingly sampled at certain points in time and the respectively sampled values enter as parameters into the flow calculation. Along with these, also other parameters, such as pressure and/or temperature of the medium, could enter into the calculation. Also, other measured variables, such as constant or variable parameters, can be taken into consideration, such as e.g. density, viscosity, chemical composition and/or conductivity of the medium. If these measured variables are stored in a calibration factor, of course, the calibration factor must be corrected, when these change as a function of time.

Thus, a flow measuring device of the invention includes for ascertaining flow of a medium flowing through a measuring tube a measuring transducer for registering a first, measurement signal dependent on flow of the measured medium in the measuring tube and an evaluation unit for ascertaining flow at least as a function of the first measurement signal and as a function of the flow cross sectional area of the medium in the measuring tube, and, furthermore, means for registering an additional, second measurement signal, which depends on the flow cross sectional area of the medium in the measuring tube and is independent of the flow velocity of the medium. The flow can be output by the flow measuring device in a predetermined form. The means for registering the second measurement signal is e.g. a strain gage. This can be placed on the outside of the measuring tube. Thus, this registers an external geometric dimension (or its change) of the measuring tube, 'external' meaning on its outside, thus the side of the measuring tube wall facing away from the lumen and, therewith, from the medium. The registered change in dimension, for example, a change of the length of periphery, e.g. circumference, of the measuring tube, depends, via a known relationship, on the cross section of the lumen of the measuring tube and therewith on the flow cross section. The flow cross sectional area can thus be easily calculated. The change in dimension could also easily permit ascertainment of pressure and/or density of the medium.

Alternatively to strain gages mounted externally on the measuring tube, the flow measuring device can be, for example, a magneto-inductive, flow measuring device e.g. with a measuring tube of a polymeric, synthetic material. A change of the flow cross sectional area of the medium through the measuring tube changes likewise the inductance of the magnet system of the magneto-inductive, flow measuring device and this can be measured to produce therefrom the second measurement signal. A further example of a form of embodiment of the invention provides that the means for registering the second measurement signal involves measuring via acoustic surface waves (SAW), possibly combined with an RFID. In such case, acoustic surface waves are applied, which transform mechanical stress or strain into a frequency analog signal. Such frequencies lie typically in the range of 500 kHz to 5 MHz. The transmission of the therefrom arising, measurement signal can occur wirelessly, such as e.g. in the case of tire pressure sensors, in the MHz range. In this example of an embodiment, the second measurement signal is produced by means of acoustic surface waves. Other means for registering the second measurement signal include e.g. one or more Wiegand wires or a capacitive distance meter arranged, in each case, on the measuring tube.

After registering the first measurement signal, which depends at least on the flow velocity of the medium in the measuring tube, and the second measurement signal, which depends on the flow cross sectional area of the medium in the measuring tube and is independent of the flow velocity of the medium in the measuring tube, flow is ascertained as a function of the first and second measurement signals, especially by an evaluating unit suitable therefor. Then, the flow can be output. Serving as first measurement signal is, for example, the measurement voltage induced in at least two measuring electrodes arranged in the measuring tube of a magneto-inductive, flow measuring device.

Besides the first and second measurement signals, the flow measuring device can include other measuring transducers, in order to measure pressure and/or temperature of the medium, wherein then, for ascertaining flow of the medium through the measuring tube, supplementally pressure and/or temperature is/are taken into consideration.

Usually, a flow measuring device with a known lumen is calibrated in a calibration plant. In the calibrating, a calibration factor or a number of calibration factors or a calibration function is/are ascertained and stored in the flow measuring device, e.g. stored in its evaluation unit. Such a calibration factor is dependent on the flow cross sectional area of the medium in the measuring tube. By means of the second measurement signal, this is now corrected and flow of the medium through the measuring tube is ascertained with the corrected calibration factor.

This is advantageous, for example, when the lumen of the measuring tube changes reversibly or irreversibly over a certain period of time, e.g. due to pressure fluctuations of the medium in the measuring tube. Such a change can be registered e.g. by measuring an external geometric dimension of the measuring tube, in order thereby to ascertain the flow cross sectional area of the medium in the measuring tube. The flow cross sectional area of the medium in the measuring tube is linked with the externally measured geometric dimension of the measuring tube via a predetermined relationship.

BRIEF DESCRIPTION OF THE DRAWINGS

The invention can have numerous forms of embodiment. Some of these will now be explained in greater detail based on the appended drawing, the figures of which show as follows, wherein equal elements are provided with equal reference characters.

DETAILED DISCUSSION IN CONJUNCTION WITH THE DRAWINGS

Figure 1:
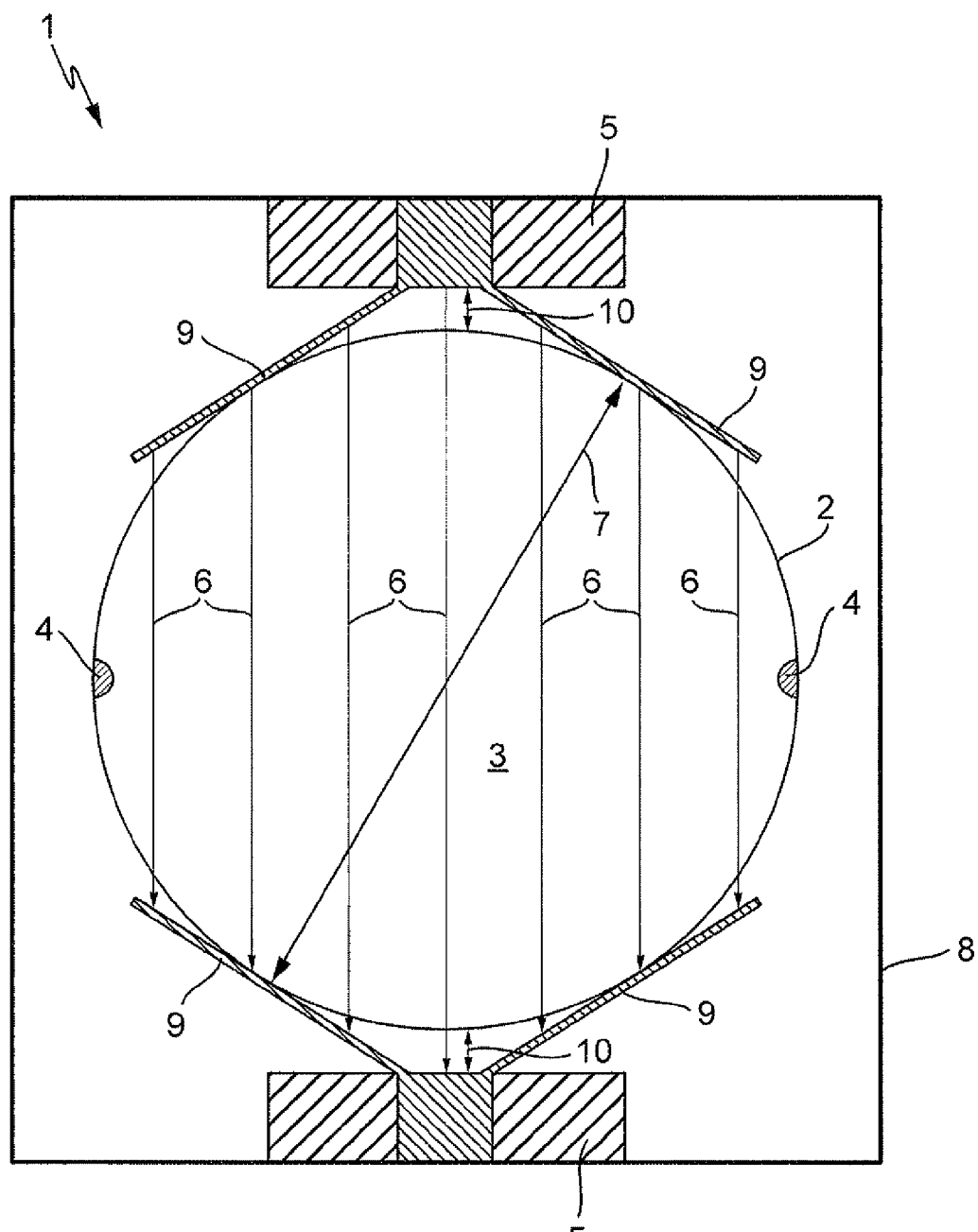
FIG. 1 is a schematically and in cross section, a magneto-inductive, flow measuring device.

FIG. 1 shows schematically in cross section a magneto-inductive, flow measuring device 1. Placed in the wall of the measuring tube 2 are two measuring electrodes 4, which contact the medium 3 in the lumen of the measuring tube. In this example, the wall of the measuring tube 2 is made of a non-electrically conductive, synthetic material, such as e.g. PE, PET, PES, PFA, PTFE, POM, PP, PPS, PF or PA. Since, via the exciter coils 5, a magnetic field, as indicated by its field lines 6, passes through the measuring tube 2, charge carriers of the medium 3 moved perpendicularly to the magnetic field induce a measurement voltage in the measuring electrodes 4 arranged essentially perpendicularly to the flow direction of the medium 3 and perpendicularly to the direction of the magnetic field. The measurement voltage induced in the measuring electrodes 4 is proportional to the flow velocity of the medium 3 averaged over the cross section of the measuring tube 2 and, thus, in the case of known cross section, proportional to the volume flow rate. The flow direction of the medium 3 in the measuring tube 2 is parallel to the longitudinal axis of the measuring tube. The cross section of the lumen of the measuring tube 2 corresponds in the case of completely filled measuring tube 2 to the flow cross sectional area of the medium 3 in the measuring tube 2. In this example of an embodiment, the measuring tube 2 has a lumen, which is essentially circular in cross section, so that the cross section of the lumen of the measuring tube 2, or flow cross sectional area of the medium 3 in the measuring tube 2, can be simply calculated via the formula for calculating a circular area. In this regard, for example, the periphery, i.e. here the circumference, of the measuring tube 2, or, as here indicated, the inner diameter 7 of the measuring tube 2, must be known.

The inner diameter 7 of the measuring tube 2 is ascertained during measurement operation of the magneto-inductive, flow measuring device 1, for example, in the following way. Arranged around the measuring tube 2 for guiding the magnetic field is a magnetic field return 8 containing likewise the exciter coils 5 and the pole sheets 9 provided for magnetic field orientation. Serving as magnetic field return could be also a correspondingly embodied housing. The exciter coils 5 and the pole sheets 9 are part of the exciter system of a magnetic circuit of soft magnetic material. Arranged between the exciter systems including the respective exciter coils and pole sheets 9 is the measuring tube 2. Between the respective exciter coils 5 and pole sheets 9 and the measuring tube 2 lie air gaps 10. The pole sheets 9 are elastic and can adjust to expansion, especially pressure related expansion, of the measuring tube 2. The exciter coils 5 are, however, solidly accommodated in the magnetic field return 8, which does not follow expansion of the measuring tube 2. As a result, the length of the air gaps 10, and, thus, the inductance of the total magnet system, changes. The change of the inner diameter 7 of the measuring tube 2 can be calculated from the change in the inductance. The inductance is, for example, determined by measuring the inductive reactance of the field system or by measuring the rise time, upon the reversing of the magnetic field. This represents the second measurement signal. It depends on the flow cross sectional area of the medium 3 in the measuring tube 2 and is independent of the flow velocity of the medium 3 in the measuring tube 2.

If the inner diameter 7 of the measuring tube 2 is known, the flow cross sectional area of the medium 3 in the measuring tube 2 can easily be calculated. Together with the voltage signal of the measuring electrodes 4 as first measurement signal, then the flow is ascertained therefrom. Its values can then be output from a suitable evaluation unit (not shown). This can happen, for example, via visual representation of the flow on a display, or discrete flow measured values can be provided in digital form, for example, via a bus output, or as an analog signal representing flow made available via a 4-20 mA-interface. Also, a control output can be provided for control of pumps or valves or the like. Furthermore, other output options can include e.g. an acoustic or optical alarm in the case of exceeding/subceeding (falling beneath) predetermined limit values.

Figure 2:
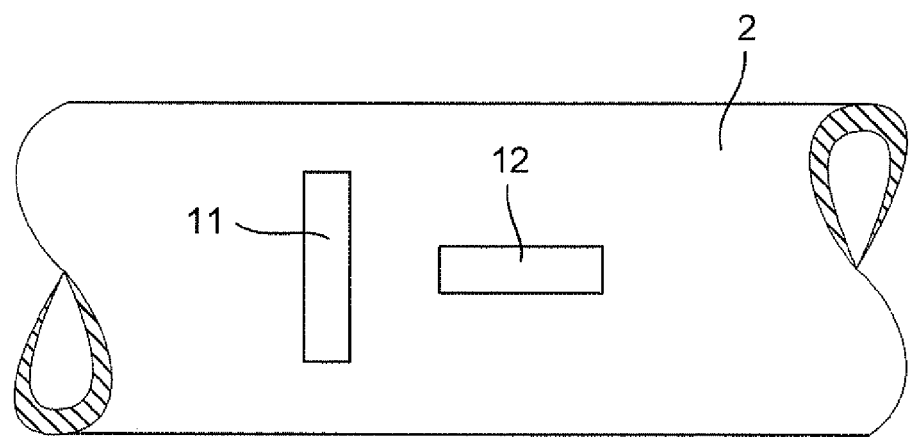
FIG. 2 is an outer wall of a measuring tube with means of the invention for registering flow cross sectional area of the medium in the measuring tube in a first embodiment.

FIG. 2 shows a measuring tube 2 unsectioned and in side view. Two strain gages 11 and 12 are placed on the outside of the measuring tube 2, thus on its wall forming the lumen of the measuring tube 2, in which the medium 3 flows. The first strain gage 11 is so arranged on the measuring tube 2 that it can sense expansion of the measuring tube 2 in the radial direction, while the second strain gages 12 measures axial expansion of the measuring tube 2.

With the first strain gage 11, thus, a second measurement signal is produced, which depends on the periphery, e.g. circumference, of the measuring tube 2, and therewith also on the flow cross sectional area of the medium 3 in the measuring tube 2, in the case of completely filled measuring tube 2. Not shown are the bridge circuits for the strain gages 11 and 12. These are, however, known to those skilled in the art. Also, not explored in greater detail here is the relationship between cross section of the lumen of the measuring tube 2, or flow cross sectional area of the medium 3 in the measuring tube 2, and the outer diameter, periphery, circumference or other geometric dimensions of the measuring tube exterior. The second measurement signal is here correspondingly registered as a function of a geometric dimension of the exterior of the measuring tube. This is, however, as just explained, dependent on the flow cross sectional area of the medium 3 in the measuring tube 2.

As a rule, flow measuring devices are calibrated. The goal can be the measuring of a mass flow or the measuring of a volume flow. In either case, there enters into the ascertaining of the flow, besides the first measurement signal, which depends on the flow velocity of the medium 3 in the measuring tube 2, also the flow cross sectional area of the medium 3 in the measuring tube. This enters, most often, via a calibration factor. The calibration factor is stored, for example, in the evaluation unit, e.g. held in a memory. It is also quite usual to store a number of calibration factors or even to have the parameters individually ready, in order that they can, in given cases, easily be changed.

If, now, according to the invention, the flow cross sectional area of the medium 3 in the measuring tube 2 is ascertained online, thus during measurement operation, with such occurring in the form of a second measurement signal dependent on the flow cross sectional area, this means that the corresponding calibration factor is changed, or corrected, online.

In addition to the first and second measurement signals, also pressure and/or temperature of the medium could be measured and enter into the ascertaining of the flow of the medium through the measuring tube. With the method of the invention, however, the pressure in the measuring tube is indirectly determinable. The expansion of the measuring tube 2 can directly or indirectly depend on the pressure of the medium 3 in the measuring tube 2.

Figure 3:
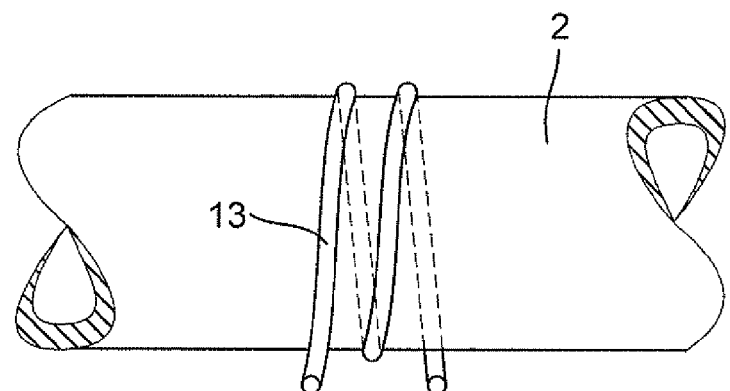
FIG. 3 is an outer wall of a measuring tube with means of the invention for registering flow cross sectional area of the medium in the measuring tube in a second embodiment.
Figure 4:
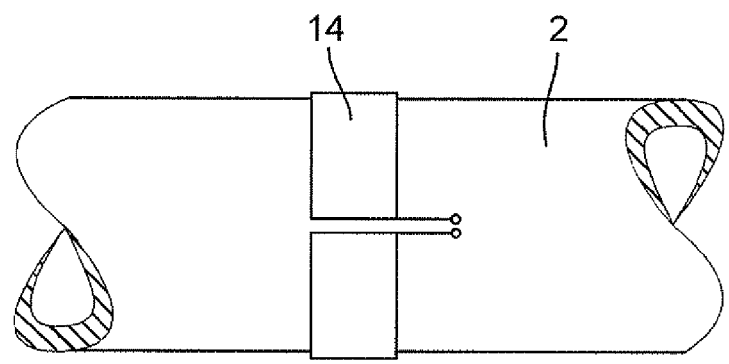
FIG. 4 is an outer wall of a measuring tube with means of the invention for registering flow cross sectional area of the medium in the measuring tube in a third embodiment.
Figure 5:
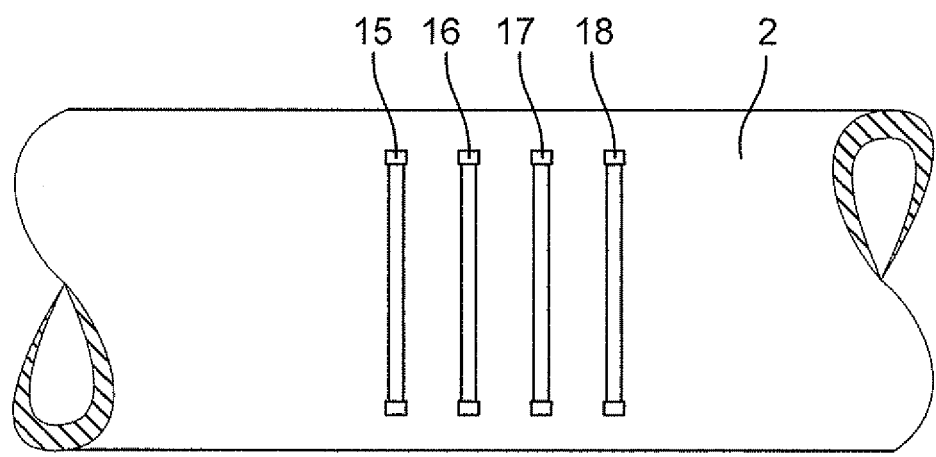
FIG. 5 is an outer wall of a measuring tube with means of the invention for registering flow cross sectional area of the medium in the measuring tube in a fourth embodiment.

FIGS. 3 to 5 show other examples of embodiments of the invention. The means in FIGS. 3 and 4 are based on the same measuring principle. FIG. 3 shows an individual wire 13 wound around the measuring tube 2. If the measuring tube 2 expands, also the wire 13 gets longer and changes its resistance correspondingly. The second measurement signal produced therefrom is, thus, directly dependent on the periphery, e.g. circumference, of the measuring tube 2 and therewith indirectly on the flow cross sectional area of the medium in the measuring tube 2.

In the other example of an embodiment in FIG. 4, a robust metal foil 14 is placed around the measuring tube 2. It has, compared with the single wire, a greater durability. The measuring principle is the same. Alternatively to the foil, a conductive coating of the measuring tube could be provided.

In FIG. 5, in contrast, a plurality of wires 15, 16, 17 and 18 with different yields are arranged on the measuring tube 2 on its outer wall. These have, as indicated, different wire diameters, or are of different materials. An expansion of the measuring tube 2 leads then step-wise to breaking of the wires. Their dimensioning can e.g. be so selected that with each percent of perimetral expansion a certain wire breaks. By testing for intact wires, information can be gathered concerning perimetral expansion. This measuring system is, however, not suitable for following elastic changes of the measuring tube 2 exactly, since the wires are destructed irreversibly. If the measuring tube 2 is, in contrast, permanently, i.e. plastically, deformed, e.g. due to a large number of pressure cycles, this form of monitoring the flow cross sectional area of the medium in the measuring tube 3 can be quite advantageous for ascertaining flow. Especially in the case of measuring tubes of synthetic material, e.g. plastic, after a large number of pressure cycles, expansions of the lumen of the measuring tube 2 of several percent can be experienced. Accordingly, the measurement error of the flow would be significant without the correction of the invention. Strain gages can over a longer period of time and in the face of such length changes be very disturbance susceptible, so that a discrete registering of flow cross sectional area can be advantageous.

The invention claimed is:

1. A flow measuring device for ascertaining the flow of a medium flowing through a measuring tube of an electrically non-conductive, synthetic material, which flow measuring device comprises:
   a measuring transducer for registering a first measurement signal dependent on flow of the measured medium in the measuring tube;
   an evaluation unit for ascertaining flow at least as a function of the first measurement signal and as a function of a flow cross sectional area of the medium in the measuring tube, and
   means for registering an additional, second measurement signal, which depends on the flow cross sectional area of the medium in the measuring tube, wherein the second measurement signal registers a change of external geometric dimensions of the measuring tube.

2. The flow measuring device as claimed in claim 1, wherein:
   said means for registering the second measurement signal is at least one strain gages.

3. The flow measuring device as claimed in claim 1, wherein:
   said evaluation unit of the flow measuring device is suitable to output the calculated flow.

4. The flow measuring device as claimed in claim 1, wherein:
   the measuring tube is at least partially of a polymer.

* * * * *